Patented Aug. 1, 1950

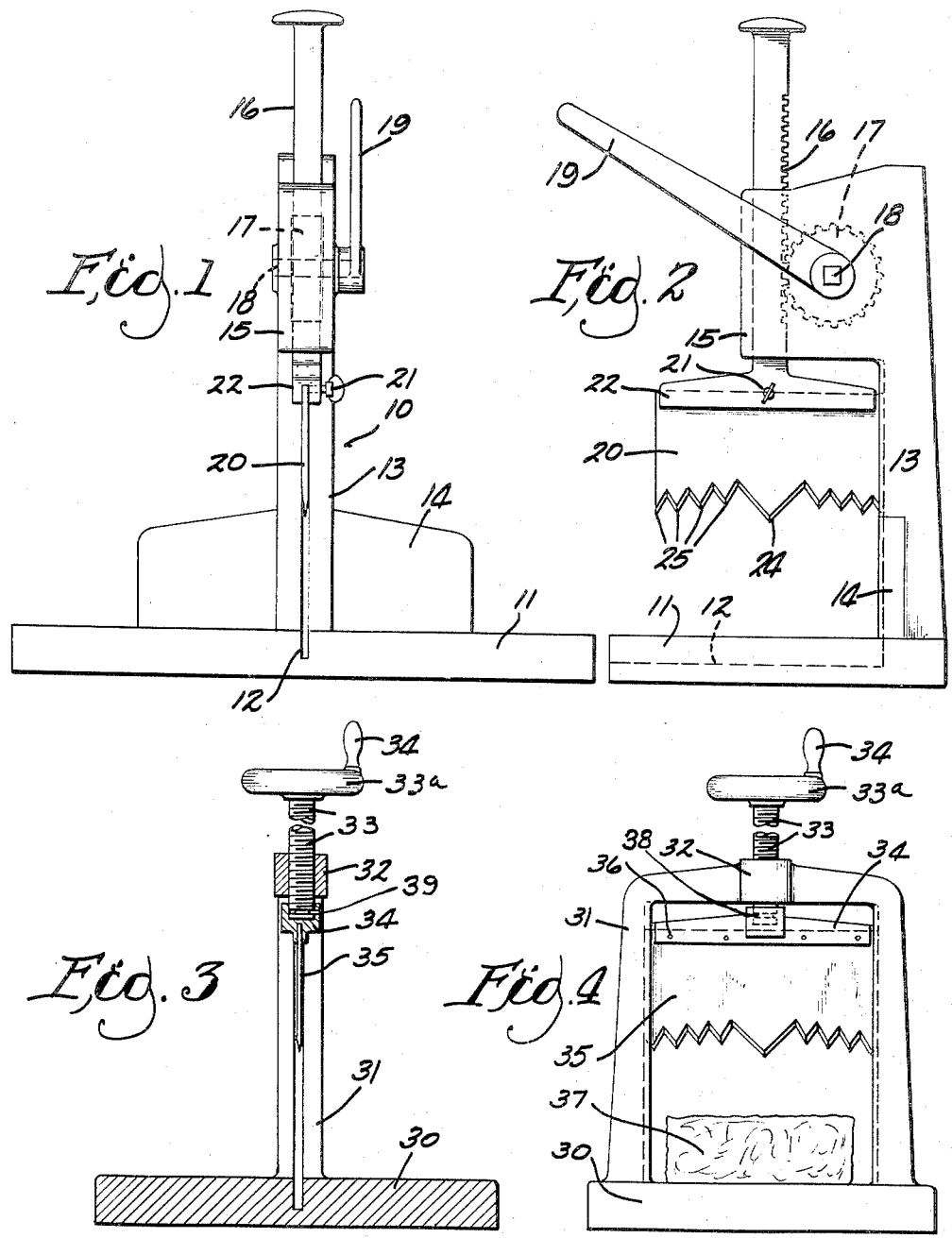

2,517,362

UNITED STATES PATENT OFFICE 2,517,362

FROZEN FOOD CUTTER BLADE

Roy H. Thompson, Shorewood, Wis.

Application August 22, 1946, Serial No. 692,243

1 Claim. (Cl. 107—21)

This invention relates to improvements in frozen food cutters and more particularly to a novel manually operated cutter including a pressure amplifying means.

An object of the invention is to provide a device of the type which will permit quick and easy cutting of the standard package of frozen food in conventional use. It is often desired to use only part of the package and the same is not easily separated with a knife or other kitchen utensils in common use.

Another object of the invention is to provide a cutter having a blade well adapted to prevent slipping or movement of the package during the cutting operation.

Other and further objects of the invention will appear as the description proceeds reference being had to the accompanying drawing, in which:

Fig. 1 is a front view in elevation of one form of the invention.

Fig. 2 is a side view in elevation of the device.

Fig. 3 is a vertical sectional view of a modified form of the invention.

Fig. 4 is a front view in elevation of the modification.

Referring more particularly to the drawings, the numeral 10 refers to the device generally having a base 11 provided with a transverse slot at 12 thereof.

A standard, 13, is fixed to base 11 and is provided with the backboard 14 for holding the frozen food in cutting position. The standard 13 has a forwardly projecting portion 15, which latter is hollow to receive the vertically movable rack 16 and the pinion 17, the latter being fixed to the pinion shaft 18 which is horizontally journalled in portion 15.

A handle member 19, is fixed to shaft 18 exteriorly of the portion 15. A toothed blade 20 is held by means of the set screw 21 in the slotted member 22 integral with and at the lower end of the rack 16. The set screw 21 in member 22 releasably secures the blade 20, which latter is formed with a relatively large central tooth 24, and a plurality of smaller teeth 25. The latter are equally divided on each side of the central large tooth 24, and converge inwardly from the blade edges to the base of the said central tooth.

In the form of the invention shown in Figs. 3 and 4, a base 30 supports a vertical bifurcated standard 31 having an integral threaded vertical sleeve at the central upper portion thereof. The sleeve 32 receives the threaded member 33 carrying at the upper end thereof and fixed thereto, the wheel 33a having the upwardly extending handle 34. Pivotally fixed to the lower end of member 33 is the slotted blade-holder 34 receiving the toothed blade 35 fixed therein by rivet or other means 36. The threaded member 33 is circularly slotted at 38 to accommodate a pin 39 in the socket 34. The pin 39 prevents longitudinal removal of the member 33 but permits the latter to swivel in the blade-holder socket 34.

In operation, a package of frozen food 37 is placed on the base 11 against the backboard 14. The handle 19 is pressed downwardly to turn the pinion 17, in turn forcing the rack 16 downwardly to force blade 20 through the frozen food 37 into the groove or slot at 12 to clear the package and make a clean cut.

The operation of the modified form of the device is similar as rotation of the wheel by means of handle 34 raises and lowers the blade 35 as desired.

It will be understood that the device is capable of many modifications in structure and design, without departing from the spirit of the invention, within the scope of the appended claim.

Having thus described my invention, what I claim and desire to secure by Letters Patent of the United States is:

In a device of the character described, a cutter blade comprising a relatively large central tooth, and pluralities of smaller teeth on each side thereof slanted inwardly toward the base of said central tooth.

ROY H. THOMPSON.

REFERENCES CITED

The following references are of record in the file of this patent:

UNITED STATES PATENTS

| Number | Name | Date |
|---|---|---|
| 488,404 | Robertson | Dec. 20, 1892 |
| 564,832 | McCown | July 28, 1896 |
| 836,541 | Spriggs | Nov. 20, 1906 |
| 1,277,116 | Phenicie | Aug. 27, 1918 |